United States Patent
Brachmann (10) Patent No.: US 12,493,083 B2
(45) Date of Patent: Dec. 9, 2025

(54) APPARATUS FOR ACQUIRING INFORMATION INDICATIVE OF MISMATCH CONNECTIONS

(71) Applicant: Nokia Solutions and Networks Oy, Espoo (FI)

(72) Inventor: Yannic Brachmann, Nuremberg (DE)

(73) Assignee: Nokia Solutions and Networks Oy, Espoo (FI)

( * ) Notice: Subject to any disclaimer, the term of this patent is extended or adjusted under 35 U.S.C. 154(b) by 144 days.

(21) Appl. No.: 18/473,866

(22) Filed: Sep. 25, 2023

(65) Prior Publication Data

US 2024/0125868 A1     Apr. 18, 2024

(30) Foreign Application Priority Data

Oct. 18, 2022   (EP) .................................... 22202045

(51) Int. Cl.
*G01R 31/55*     (2020.01)
(52) U.S. Cl.
CPC .................................. *G01R 31/55* (2020.01)
(58) Field of Classification Search
None
See application file for complete search history.

(56) References Cited

U.S. PATENT DOCUMENTS

| | | | |
|---|---|---|---|
| 6,457,071 B1 | 9/2002 | Thorland et al. | |
| 7,423,434 B2 | 9/2008 | Stancil | |
| 8,112,568 B1* | 2/2012 | Ely | G06F 13/4081 710/301 |
| 9,929,516 B1 | 3/2018 | Sasagawa et al. | |
| 2009/0001995 A1 | 1/2009 | Satoh et al. | |
| 2011/0264968 A1* | 10/2011 | Shilo | H04B 3/46 714/704 |
| 2017/0286351 A1 | 10/2017 | Williams et al. | |
| 2021/0215773 A1 | 7/2021 | Tsuruta | |

FOREIGN PATENT DOCUMENTS

| | | |
|---|---|---|
| CN | 111948427 A | 11/2020 |
| JP | H08129441 A | 5/1996 |
| JP | H11338594 A | 12/1999 |

(Continued)

OTHER PUBLICATIONS

English translation of WO-2007091332-A1 (Year: 2007).*

(Continued)

*Primary Examiner* — Jermele M Hollington
(74) *Attorney, Agent, or Firm* — Nokia Technologies Oy (57) ABSTRACT

An apparatus include a first circuit board, which has a detection circuit. The first circuit board has a first plurality of cable plugs, wherein each of the cable plugs has an array of electrical contacts such that a same multiwire cable type is physically and electrically pluggable to the different cable plugs of the first plurality. The detection circuit is configured to obtain information indicative of whether, at least, one of the cable plugs is connected by a multiwire cable of the multiwire cable type to a matched cable plug of a second plurality of cable plugs on a second circuit board. The detection circuit is configured to obtain the information by sensing a pattern of direct current signals across a first subset of the electrical contacts of the one of the cable plugs of the first circuit board.

10 Claims, 5 Drawing Sheets

(56) References Cited

FOREIGN PATENT DOCUMENTS

WO     WO-2007091332 A1 *   8/2007   .......... G01R 31/043
WO        2019/224955 A1    11/2019

OTHER PUBLICATIONS

Extended European Search Report received for corresponding European Patent Application No. 22202045.5, dated Mar. 28, 2023, 8 pages.
Reasons for Refusal received for corresponding Japanese Patent Application No. 2023-175705, dated Dec. 24, 2024, 6 pages of Reasons for Refusal and 7 pages of translation/summary available.

* cited by examiner

APPARATUS FOR ACQUIRING INFORMATION INDICATIVE OF MISMATCH CONNECTIONS

FIELD OF THE INVENTION

The disclosure relates to an apparatus for acquiring information indicative of mismatch connections.

BACKGROUND

Customary circuit boards may have a plurality of cable plugs such that a same multiwire cable type is physically and electrically pluggable to the different cable plugs of the plurality.

SUMMARY

Various embodiments provide an apparatus comprising: a first circuit board having a first plurality of cable plugs, each of the cable plugs of the first plurality having an array of electrical contacts such that a same multiwire cable type is physically and electrically pluggable to the different cable plugs of the first plurality; and wherein the first circuit board includes a detection circuit configured to obtain information indicative of whether, at least, one of the cable plugs of the first plurality is connected by a multiwire cable of the multiwire cable type to a matched cable plug of a second plurality of cable plugs on a second circuit board, the detection circuit being configured to obtain the information by sensing a pattern of direct current signals across a first subset of the electrical contacts of the one of the cable plugs of the first circuit board.

According to some embodiments, the detection circuit is configured to estimate the pattern as a binary valued vector in which each component is indicative of a corresponding one of the signals.

According to some embodiments, the first circuit board further includes a light source connected to indicate whether the one of the cable plugs of the first circuit board is connected to the matched cable plug of the second plurality.

According to some embodiments, the detection circuit is configured to obtain information indicative of whether the one of the cable plugs of the first circuit board is connected by the multiwire cable to any of the cable plugs of the second circuit board by sensing a direct current signal value at one of the electrical contacts of the one of the cable plugs of the first circuit board.

According to some embodiments, the detection circuit is configured to obtain other information indicative of whether another of the cable plugs of the first circuit board is connected by a multiwire cable of the multiwire cable type to a matched cable plug of the second plurality of cable plugs on the second circuit board, the detection circuit being configured to obtain the other information by sensing a pattern of direct current signals across the same first subset of the electrical contacts of the another of the cable plugs of the first circuit board.

According to some embodiments, the first circuit board further includes a voltage pull-up circuit connecting a pull-up voltage source to the same first subset of the electrical contacts of each of the cable plugs of the first circuit board.

According to some embodiments, a second subset of the electrical contacts of each cable plug of the first plurality is connected to a corresponding identifying pattern of ground and/or open circuit connections in the first circuit board such that the identifying patterns of connections for different ones of the cable plugs of the first plurality are different.

According to some embodiments, the apparatus further comprises the second circuit board, the cable plugs of the second plurality being such that the same multiwire cable type is physically and electrically pluggable to the different cable plugs of the second plurality; and a plurality of multiwire cables connected between some of the cable plugs of the first and second pluralities; and wherein in the second circuit board, the first subset of the electrical contacts of each cable plug of the second plurality is connected to a corresponding identifying pattern of ground and/or open circuit connections in the second circuit board such that the identifying patterns of connections for different ones of the cable plugs of the second plurality are different.

According to some embodiments, the second circuit board further includes another voltage pull-up circuit connecting a pull-up voltage source to the electrical contacts of the second subset of each of the cable plugs of the second plurality.

According to some embodiments, the pattern across the first subset of electrical contacts of any one of the cable plugs of the first circuit board identifies a specific one of the cable plugs of the second circuit board in response to a multiwire cable connecting the any one of the cable plugs of the first circuit board to the specific one of the cable plugs of the second circuit board.

According to some embodiments, the second circuit board includes a second detection circuit configured to obtain other information indicative of whether at least a particular one of the cable plugs of the second circuit board is connected by a multiwire cable to a matched one of the cable plugs of the first circuit board, the second detection circuit being configured to obtain the other information by sensing a pattern of direct current signals across the second subset of the electrical contacts of the particular one of the cable plugs of the second circuit board.

BRIEF DESCRIPTION OF THE FIGURES

Further features, aspects and advantages of the illustrative embodiments are given in the following detailed description with reference to the drawings in which.

DESCRIPTION OF THE ILLUSTRATIVE EMBODIMENTS

Figure 1:
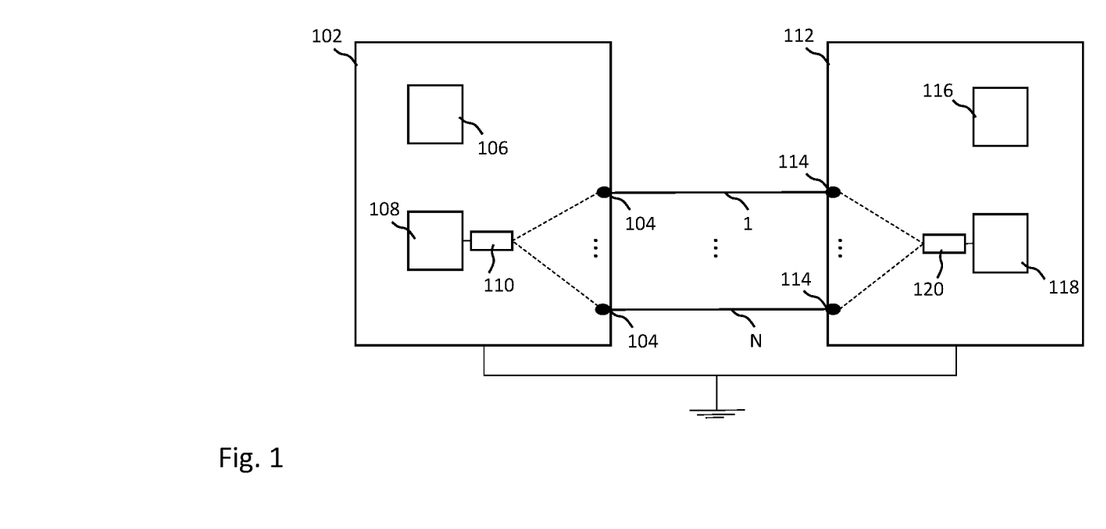
FIG. 1 schematically depicts an embodiment of an apparatus.

FIG. 1 schematically depicts an embodiment of an apparatus.

The apparatus comprises a first circuit board 102.

The first circuit board 102 comprises a first plurality of cable plugs 104.

The first circuit board 102 includes a first detection circuit 106.

According to some embodiments, the first circuit board 102 further includes a first pull-up voltage source 108.

According to some embodiments, the first pull-up voltage source 108 provides 2.5V. The voltage may be any other reasonable voltage.

According to some embodiments, the first circuit board 102 further includes a first voltage pull-up circuit 110. According to some embodiments, the first pull-up circuit 110 comprises a resistor, e.g. of 10 kOhm. The resistance may be any reasonable resistance. According to some embodiments, the first pull-up circuit 110 comprises a capacitor, e.g. of 100 nF, for de-glitching. The capacitance may be any reasonable capacitance.

According to some embodiments, the apparatus comprises a second circuit board 112.

The second circuit board 112 comprises a second plurality of cable plugs 114.

According to some embodiments, the second circuit board 112 includes a second detection circuit 116.

The second circuit board 112 includes a second pull-up voltage source 118. According to some embodiments, the second pull-up voltage source 118 provides 2.5V. The voltage may be any other reasonable voltage.

The second circuit board 112 further includes a second voltage pull-up circuit 120. According to some embodiments, the second pull-up circuit 120 comprises a resistor, e.g. of 10 kOhm. The resistance may be any reasonable resistance. According to some embodiments, the second pull-up circuit 120 comprises a capacitor, e.g. of 100 nF, for de-glitching. The capacitance may be any reasonable capacitance.

The first circuit board 102 and the second circuit board 112 are connected to a common ground.

According to some embodiments, the apparatus comprises an input resistor, e.g. of 100 Ohm, in series with the first detection circuit 106 or the second detection circuit 116.

Figure 2:
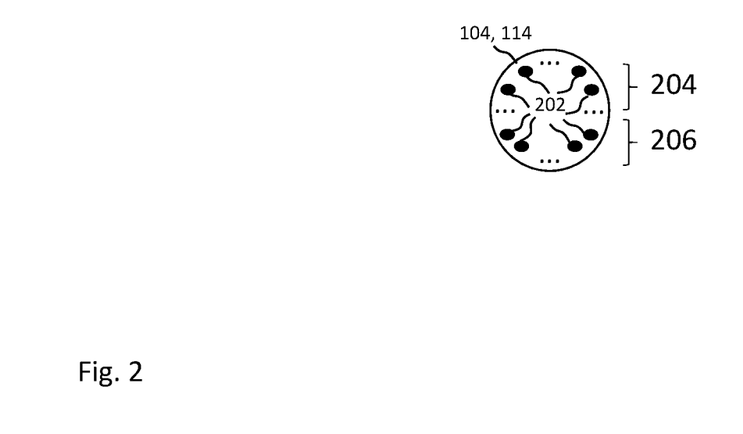
FIG. 2 schematically depicts a cable plug.

FIG. 2 schematically depicts an exemplary cable plug 104, 114.

The cable plug 104, 114 comprises an array of electrical contacts 202.

The cable plugs 104 of the first plurality each comprises the array of electrical contacts 202 such that a same multiwire cable type is physically and electrically pluggable to the different cable plugs 104 of the first plurality.

The cable plugs 114 of the second plurality each comprises the array of electrical contacts 202 such that the same multiwire cable type is physically and electrically pluggable to the different cable plugs 114 of the second plurality.

A plurality of multiwire cables 1, . . . , N is connected between some of the cable plugs of the first and second pluralities.

In the first circuit board 102, each cable plug 104 of the first plurality comprises a first subset 204 of the electrical contacts 202 and a second subset 206 of the electrical contacts 202.

In the second circuit board 112, each cable plug 114 of the second plurality comprises a first subset 204 of the electrical contacts 202 and a second subset 206 of the electrical contacts 202.

According to some embodiments, the multiwire cable comprises a connector for connecting the multiwire cable to the cable plug 104, 114. According to some embodiments, the connector or the cable plug 104, 114 is coded to ensure the electrical contact 202 at the same position in the array of electrical contacts 202 connects to same wire of the multiwire cable for each of the cable plugs and multiwire cables.

According to some embodiments, in the first circuit board 102, the second subset 206 of the electrical contacts 202 of each cable plug 104 of the first plurality is connected to a corresponding identifying pattern of ground and/or open circuit connections in the first circuit board 102.

The second subset 206 is connected such that the identifying patterns of connections for different ones of the cable plugs 104 of the first plurality are different.

According to some embodiments, the first voltage pull-up circuit 110 connects the first pull-up voltage source 108 to the electrical contacts 202 of the first subset 204 of each of the cable plugs 104 of the first plurality.

According to some embodiments, the first pull-up voltage source 108 provides the first pull-up voltage for the same first subset 204 of the electrical contacts 202 of each of the cable plugs 104 of the first circuit board 102.

According to some embodiments, the first voltage pull-up circuit 110 connects the first pull-up voltage source 108 to the same first subset 204 of the electrical contacts 202 of each of the cable plugs 104 of the first circuit board 102.

According to some embodiments, the electrical contacts 202 of the first subset 204 of the first circuit board 102 are each connected via one 10 kOhm pull-up resistor to the first pull-up voltage source 108. According to some embodiments, the electrical contacts 202 of the first subset 204 of the first circuit board 102 are each connected to the first pull-up voltage source 108 via one 100 nF capacitor for de-glitching. According to some embodiment, the capacitor is connected in parallel with the resistor.

In the second circuit board 112, the first subset 204 of the electrical contacts 202 of each cable plug 114 of the second plurality is connected to a corresponding identifying pattern of ground and/or open circuit connections in the second circuit board 112. The first subset 204 is connected such that the identifying patterns of connections for different ones of the cable plugs 114 of the second plurality are different.

According to some embodiments, in the second circuit board 112, the second voltage pull-up circuit 120 connects the second pull-up voltage source 118 to the electrical contacts 202 of the second subset 206 of each of the cable plugs 114 of the second plurality.

According to some embodiments, the electrical contacts 202 of the second subset 206 of the second circuit board 112 are each connected via one 10 kOhm pull-up resistor to the second pull-up voltage source 118. According to some embodiments, the electrical contacts 202 of the second subset 206 of the second circuit board 112 are each connected to the second pull-up voltage source 118 via one 100 nF capacitor for de-glitching. According to some embodiment, the capacitor is connected in parallel with the resistor.

This means, that in response to a multiwire cable 1, . . . , N connecting the any one of the cable plugs 104 of the first circuit board 102 to the specific one of the cable plugs 114 of the second circuit board 112, the pattern across the first subset 204 of electrical contacts 202 of any one of the cable plugs 104 of the first circuit board 102 identifies a specific one of the cable plugs 114 of the second circuit board 112.

This means, that in response to the multiwire cable 1, . . . , N connecting the any one of the cable plugs 104 of the first circuit board 102 to the specific one of the cable plugs 114 of the second circuit board 112, the pattern across the second subset 206 of electrical contacts 202 of any one of the cable plugs 114 of the second circuit board 112 identifies a specific one of the cable plugs 104 of the first circuit board 102.

The configuration of contacts in the cable plugs being used for providing the pattern may be adapted according to the type of the same multiwire cable, e.g. to suit various types of same multiwire cables, e.g. for use with a same crossed multiwire cable.

The first detection circuit 106 is configured to obtain information indicative of whether, at least, one of the cable plugs 104 of the first plurality of the first circuit board 102 is connected by a multiwire cable 1, . . . , N of the multiwire cable type to a matched cable plug 114 of the second plurality of cable plugs 114 on the second circuit board 112.

According to some embodiments, the first detection circuit 106 is configured to obtain other information indicative of whether another of the cable plugs 104 of the first circuit board 102 is connected by a multiwire cable of the multiwire cable type to a matched cable plug 114 of the second plurality of cable plugs 114 on the second circuit board 112.

According to some embodiments, the first detection circuit 106 is configured to obtain the information and the other information by sensing a pattern of direct current signals across the same first subset 204 of the electrical contacts 202 of the particular one of the cable plugs 104 of the first circuit board 102.

According to some embodiments, the first detection circuit 106 is configured to estimate the pattern as a binary valued vector in which each component is indicative of a corresponding one of the signals.

According to some embodiments, the first detection circuit 106 is configured to detect a presence of a connection between a cable plug 104 of the first circuit board 102 and a cable plug 114 of the second circuit board 112.

According to some embodiments, the first detection circuit 106 is configured to obtain information indicative of whether the one of the cable plugs 104 of the first circuit board 102 is connected by the multiwire cable 1, . . . , N to any of the cable plugs 114 of the second circuit board 112 by sensing a direct current signal value at one of the electrical contacts 202 of the one of the cable plugs 104 of the first circuit board 102.

Direct current signal value in this context means that the direct current signal has a direct current of the value at a static voltage.

According to some embodiments, the second detection circuit 116 is configured to obtain other information indicative of whether at least a particular one of the cable plugs 114 of the second circuit board 112 is connected by a multiwire cable 1, . . . , N to a matched one of the cable plugs 104 of the first circuit board 102.

According to some embodiments, the second subset 206 of the electrical contacts 202 of each cable plug 104 of the first plurality is connected to a corresponding identifying pattern of ground and/or open circuit connections in the first circuit board 102. According to some embodiments, the second subset 206 of the electrical contacts 202 of each cable plug 104 of the first plurality is connected such that the identifying patterns of connections for different ones of the cable plugs 104 of the first plurality are different.

According to some embodiments, the second detection circuit 116 is configured to obtain this other information by sensing a pattern of direct current signals across the second subset 206 of the electrical contacts 202 of the particular one of the cable plugs 114 of the second circuit board 112.

Figure 3:
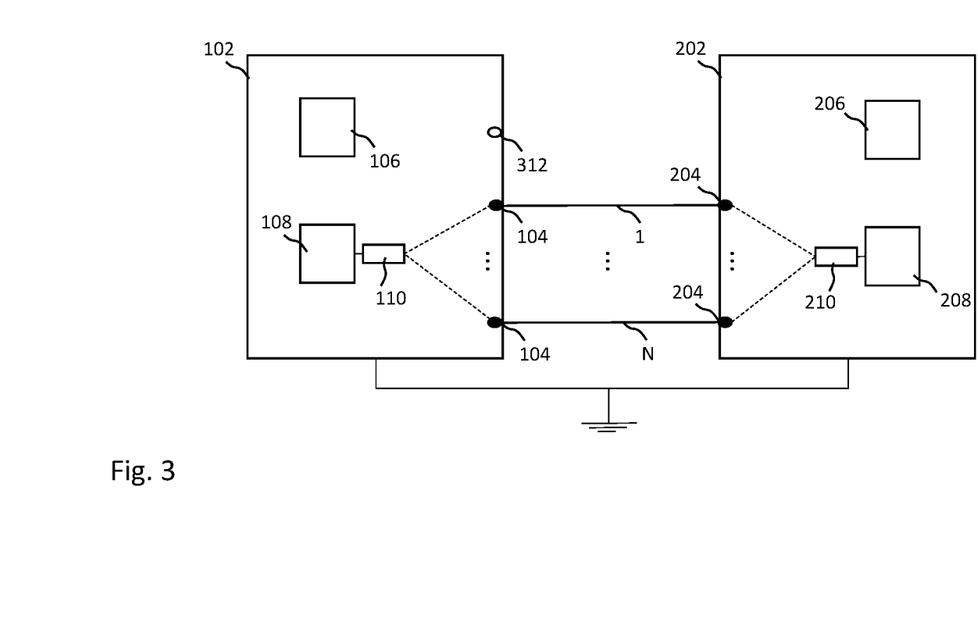
FIG. 3 schematically depicts another embodiment of the apparatus.

FIG. 3 depicts another embodiment of the apparatus wherein the first circuit board 102 further includes a light source 312 connected to indicate whether the one of the cable plugs 104 of the first circuit board 102 is connected to the matched cable plug 114 of the second plurality. The light source 312 may be a Light emitting diode, LED.

According to some embodiments, the apparatus is configured to determine whether there is a mismatch depending on the information of whether, at least, one of the cable plugs 104 of the first plurality is connected by a multiwire cable 1, . . . , N of the multiwire cable type to a matched cable plug 114 of a second plurality of cable plugs 114 on the second circuit board 112.

According to some embodiments, the first detection circuit 106 is configured to determine whether there is the mismatch.

According to some embodiments, the light source 312 is hard wired to the first detection circuit 106, to indicate mismatched or matched connection. According to some embodiments, the first detection circuit 106 and the light source 312 are configured to give an automatic matched connection light signal.

According to some embodiments, the light source 312 provides optical indication to ease up the use of the apparatus.

According to some embodiments, the light source 312 is configured to output a red light indicating that the multiwire cable is not present or connected at a near end, a far end or both.

According to some embodiments, the light source 312 is configured to output a yellow light indicating that the multiwire cable is not connected at the right position at a near end, a far end or both.

According to some embodiments, the light source 312 is configured to output a green light indicating that no issues are detected.

According to some embodiments, a blinking light source 312 provides other event indications.

According to some embodiments, the light source 312 is configured to output a blinking light to indicate another event. According to some embodiments, the apparatus is configured to output a red blinking light for indicating a critical communication error. According to some embodiments, the apparatus is configured to output yellow blinking light for indicating a link initialization in progress. According to some embodiments, the apparatus is configured to output a green blinking light to indicate a flawless communication.

According to some embodiments, the apparatus is configured to signal with the light source 312 one of the following cable states:

RED: not present (no interrupt)
RED, blinking: not present, with interrupt pending
AMBER: present, wrong counterpart
AMBER, blinking: present, wrong counterpart, with interrupt pending
GREEN: present, correct counterpart
GREEN, blinking: present, correct counterpart, with interrupt pending.

The apparatus may comprise an array of light sources 312, e.g. an LED array, to indicate mismatched or matched connections individually. According to some embodiments, the array of light sources 312 and the first detection circuit 106 is configured to give a matched or mismatched connection light signal for some or each of the cable plugs 104 of the first circuit board 102 individually.

The second circuit board 112 may be configured with a light source or an array of light sources as well, wherein the second detection circuit 116 is configured to give a matched or mismatched connection light signal for some or each of the cable plugs 114 of the second circuit board 112 individually.

Figure 4:
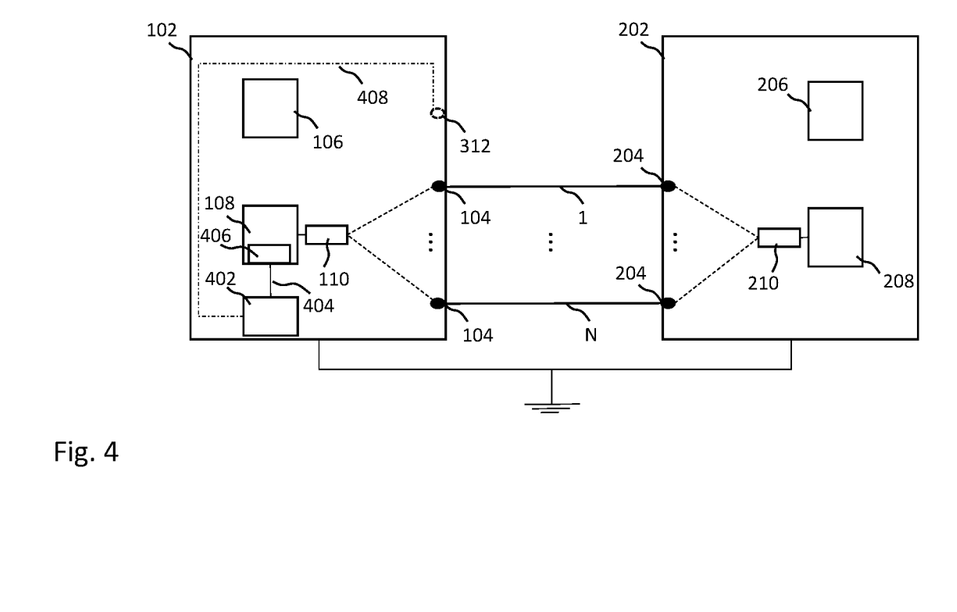
FIG. 4 schematically depicts another embodiment of the apparatus.

FIG. 4 depicts another embodiment of the apparatus, wherein the apparatus further comprises a processor 402 that is configured to determine whether there is the mismatch depending on the information gathered by the first detection circuit 106.

According to some embodiments, the processor 402 is connected to the first detection circuit 108 via a bus 404, e.g. an i2c bus, or a point-to-point connection, e.g. Ethernet.

According to some embodiments, the first detection circuit 108 is configured to report an event to the processor 402 via the bus 404. The event is for example, removing or inserting a multiwire cable into a cable plug monitored by the first detection circuit 108.

According to some embodiments, the first detection circuit 108 reports a status of the cable plug monitored by the first detection circuit 108 as it is asked by the processor 402. According to some embodiments, the first detection circuit 108 is configured for triggering an interrupt signal automatically to report the event to the processor 402. This means, the status information can be received and tracked by continuously polling or as a reading reaction to the interrupt.

According to some embodiments, the first detection circuit 108 has a register section 406. The register section comprises an array of interrupt registers to store events of pulling and plugging cables. According to some embodiments, the first detection circuit 108 is configured to store the event of pulling or plugging a cable in an interrupt register of the first array as long as the interrupt register it is not explicitly cleared.

According to some embodiments, the processor 402 is configured to read the interrupt register. According to some embodiments, the processor 402 is configured to clear the interrupt register on read.

According to some embodiments, the register section 406 comprises a second array of registers that is configured to store the bits that correspond to the pattern detected by the first detection circuit 108 in a pattern register of the second array.

According to some embodiments, the processor 402 is configured to read the bits representing the pattern.

According to some embodiments, the processor 402 is configured to read the bits in the pattern register.

The light source 312 may be connected to the processor 402 via a link 408. The processor 402 may be configured to indicate a mismatched or matched connection with the light source 312.

The array of light sources 312 may be connected to the processor 402 by the link 408. The processor 402 may be configured to indicate a mismatched or matched connection of some or each of the cable plugs 114 of the second circuit board 112 individually with the array of light sources 312.

According to some embodiments, in the first circuit board 102, some of the second subset 206 of the electrical contacts 202 of each of the cable plugs 104 or the first plurality are connected to ground and some are open circuit.

According to some embodiments, in the second circuit board 112, some of the first subset 204 of the electrical contacts 202 of each of the cable plugs 114 or the second plurality are connected to ground and some are open circuit.

In some embodiments, for the mismatch detection, a truth table is used with each of the mismatch detection lines representing one bit.

For example, the truth table encodes which of the cable plugs 104 of the first circuit board 102 connect to which of the cable plugs 114 of the second circuit board 112 according to a connection scheme.

For example, the truth table comprises lines, wherein each line corresponds to one of the cable plugs 104 of the first circuit board 102 and comprises an encoding according to the connection scheme.

The line corresponds to the pattern. According to some embodiments, the line corresponds to the binary valued vector.

According to some embodiments, the first subset 204 on the first circuit board 102 comprises four connectors 202.

In an exemplary connection scheme for N=16 multiwire cables and four connectors 202 in the first subsets 204, the pattern is encoded by four bits. Each of the four bits corresponds to a different one of the connectors 202 of the first subset 204 on each of the first circuit board 102 and the second circuit board 112. Within the first subsets 204, the same connector 202 corresponds to the same bit. The connections scheme is for example:

| Cable # | Bit 3 | Bit 2 | Bit 1 | Bit 0 |
|---------|-------|-------|-------|-------|
| 1       | 0     | 0     | 0     | 0     |
| 2       | 0     | 0     | 0     | 1     |
| 3       | 0     | 0     | 1     | 0     |
| 4       | 0     | 0     | 1     | 1     |
| 5       | 0     | 1     | 0     | 0     |
| 6       | 0     | 1     | 0     | 1     |
| 7       | 0     | 1     | 1     | 0     |
| 8       | 0     | 1     | 1     | 1     |
| 9       | 1     | 0     | 0     | 0     |
| 10      | 1     | 0     | 0     | 1     |
| 11      | 1     | 0     | 1     | 0     |
| 12      | 1     | 0     | 1     | 1     |
| 13      | 1     | 1     | 0     | 0     |
| 14      | 1     | 1     | 0     | 1     |
| 15      | 1     | 1     | 1     | 0     |
| 16      | 1     | 1     | 1     | 1     | wherein
0: indicates cable connected to ground
1: indicates an intended open connection in the pattern.

According to some embodiments, the information gathered by the first detection circuit 106 or the second detection circuit 116 is encoded as a set of bits, wherein a bit value
0: indicates cable connected to ground is detected,
1: indicates an intended open connection in the pattern A position of a bit in the truth table in the example matches a position in the array of electrical contacts 202 in the first subset 204. The position in the array of electrical contacts 202 may be matched to the position of the bits in the truth table in another way as well, e.g. by a further mapping.

If there is a match in cabling, the bits that correspond to the information gathered by the first detection circuit 106 or the second detection circuit 116 for a specific multiwire cable match the expectation indicated by the bits in its entry in the truth table. If there is a mismatch in cabling, at least one of the bits that corresponds to the information gathered by the first detection circuit 106 for the specific multiwire cable fails to match to the corresponding bit in the expectation indicated by the truth table for this specific multiwire cable.

According to some embodiments, each of the multiwire cables provides ten wires. The multiwire cable may provide more or less than ten wires.

According to some embodiments, the first subset 204 of electrical connectors 202 comprises five electrical connectors 202: one electrical connector 202 for presence detection, four electrical connectors 202 for mismatch detection.

The four electrical connectors 202 for mismatch detection may be encoded by the bit 0, the bit 1, the bit 2, and the bit 3 of the truth table.

An indication for the presence detection may be encoded by an additional bit, bit 4:

| Cable # | Bit 4 | Bit 3 | Bit 2 | Bit 1 | Bit 0 |
|---------|-------|-------|-------|-------|-------|
| 1  | 0 | 0 | 0 | 0 | 0 |
| 2  | 0 | 0 | 0 | 0 | 1 |
| 3  | 0 | 0 | 0 | 1 | 0 |
| 4  | 0 | 0 | 0 | 1 | 1 |
| 5  | 0 | 0 | 1 | 0 | 0 |
| 6  | 0 | 0 | 1 | 0 | 1 |
| 7  | 0 | 0 | 1 | 1 | 0 |
| 8  | 0 | 0 | 1 | 1 | 1 |
| 9  | 0 | 1 | 0 | 0 | 0 |
| 10 | 0 | 1 | 0 | 0 | 1 |
| 11 | 0 | 1 | 0 | 1 | 0 |
| 12 | 0 | 1 | 0 | 1 | 1 |
| 13 | 0 | 1 | 1 | 0 | 0 |
| 14 | 0 | 1 | 1 | 0 | 1 |
| 15 | 0 | 1 | 1 | 1 | 0 |
| 16 | 0 | 1 | 1 | 1 | 1 | wherein

0: indicates cable connected on both ends

1: indicates cable not connected (at least on one end)

This means, Bit 4=0 indicates for a specific multiwire cable that this multiwire cable is connected. This means, Bit 4=1 indicates the specific multiwire cable is not connected on either a near end, a far end or both sides of the multiwire cable.

According to some embodiments, the apparatus is configured for output of a result of the mismatch detection during an installation or debugging of the connections by the multiwire cables 1, . . . , N. According to some embodiments, the apparatus is configured for output of a result of the mismatch detection before the multiwire cables 1, . . . , N are put into operation. According to some embodiments, the apparatus is configured for output of an indication bi-directionally, i.e. a result of the mismatch detections checked on either of both ends of the multiwire cables 1, . . . , N individually.

According to some embodiments, the apparatus is configured for generating an interrupt signal that generates a slope, either a rising or a falling slope, to signal a change in a status of the presence detection described above. This signals when a multiwire cable 1, . . . , N is getting connected to both ends or is removed at one end.

According to some embodiments, the apparatus is configured for reading the register in response to the interrupt signal. According to some embodiments, the apparatus is configured for detecting which of the multiwire cables 1, . . . , N has a status change.

According to some embodiments, for testing the first detection circuit 106 or the second detection circuit 116 or the processor 402, the apparatus is configured for faking a signal indicating "1" as "0" and vice-versa.

According to some embodiments, the apparatus is configured for providing the interrupt signal and or content of the register via an extra line for real time detection to the processor 402.

Figure 5:
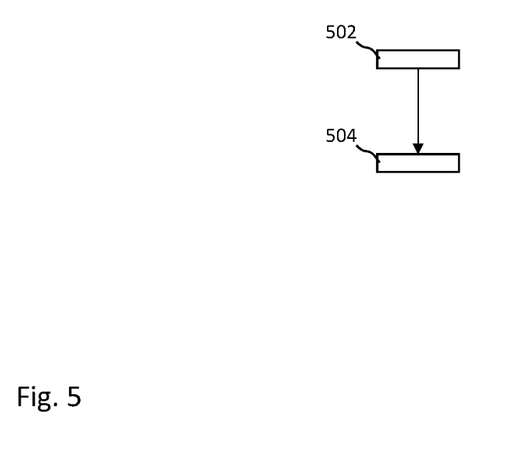
FIG. 5 depicts steps in a method of operating the apparatus.

FIG. 5 depicts steps in a method of operating the apparatus.

The method comprises a step 502 comprising obtaining information indicative of whether, at least, one of the cable plugs 104 of the first plurality is connected by the multiwire cable 1, . . . , N of the multiwire cable type to the matched cable plug 114 of the second plurality of cable plugs 114 on the second circuit board 112.

The information is obtained by sensing the pattern of direct current signals across the first subset 204 of the electrical contacts 202 of the one of the cable plugs 104 of the first circuit board 102.

According to some embodiments, the method comprises estimating the pattern as a binary valued vector in which each component is indicative of a corresponding one of the signals.

According to some embodiments, the information indicative of whether the one of the cable plugs 104 of the first circuit board 102 is connected by the multiwire cable 1, . . . , N to any of the cable plugs 114 of the second circuit board 112 is obtained by sensing the direct current signal value at one of the electrical contacts 202 of the one of the cable plugs 104 of the first circuit board 102.

According to some embodiments, the method comprises obtaining the other information indicative of whether another of the cable plugs 104 of the first circuit board 102 is connected by a multiwire cable of the multiwire cable type to a matched cable plug 114 of the second plurality of cable plugs 114 on the second circuit board 112.

According to some embodiments, the other information is obtained by sensing a pattern of direct current signals across the same first subset 204 of the electrical contacts 202 of the another of the cable plugs 104 of the first circuit board 102.

According to some embodiments, the method comprises a step 504, wherein it is indicated whether the one of the cable plugs 104 of the first circuit board 102 is connected to the matched cable plug 114 of the second plurality with the light source 312.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes, which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuitry (ASIC), field programmable gate array (FPGA), read only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
   a first circuit board having a first plurality of cable plugs, each of the cable plugs of the first plurality having an array of electrical contacts such that a same multiwire cable type is physically and electrically pluggable to the different cable plugs of the first plurality;
   wherein the first circuit board includes a detection circuit configured to obtain information indicative of whether, at least, one of the cable plugs of the first plurality is connected by a matched cable plug of a second plurality of cable plugs on a second circuit board, the detection circuit being configured to obtain the information by sensing a pattern of direct current signals across a first subset of the electrical contacts of the one of the cable plugs of the first circuit board; and
   wherein the first circuit board further includes a voltage pull-up circuit connecting a pull-up voltage source to the same first subset of the electrical contacts of each of the cable plugs of the first circuit board.

2. The apparatus of claim 1, wherein the detection circuit is configured to estimate the pattern as a binary valued vector in which each component is indicative of a corresponding one of the signals.

3. The apparatus of claim 1, wherein the first circuit board further includes a light source connected to indicate whether the one of the cable plugs of the first circuit board is connected to the matched cable plug of the second plurality.

4. The apparatus of claim 1, wherein the detection circuit is configured to obtain other information indicative of whether another of the cable plugs of the first circuit board is connected by the multiwire cable to any of the cable plugs of the second circuit board by sensing a direct current signal value at one of the electrical contacts of the one of the cable plugs of the first circuit board.

5. The apparatus of claim 1, wherein the detection circuit is configured to obtain other information indicative of whether another of the cable plugs of the first circuit board is connected by a multiwire cable of the multiwire cable type to a matched cable plug of the second plurality of cable plugs on the second circuit board, the detection circuit being configured to obtain the other information by sensing a pattern of direction current signals across the same first subset of the electrical contacts of the another of the cable plugs of the first circuit board.

6. The apparatus of claim 1, wherein a second subset of the electrical contacts of each cable plug of the first plurality is connected to a corresponding identifying pattern of ground and/or open circuit connections in the first circuit board such that the identifying patterns of connections for different ones of the cable plugs of the first plurality are different.

7. The apparatus of claim 1, further comprising
   the second circuit board, the cable plugs of the second plurality being such that the same multiwire cable type is physically and electrically pluggable to the different cable plugs of the second plurality;
   a plurality of multiwire cables connected between some of the cable plugs of the first and second pluralities; and
   wherein in the second circuit board, the first subset of the electrical contacts of each cable plug of the second plurality is connected to a corresponding identifying pattern of ground and/or open circuit connections in the second circuit board such that the identifying patterns of connections for different ones of the cable plugs of the second plurality are different.

8. The apparatus of claim 7, wherein the second circuit board further includes another voltage pull-up circuit connecting a pull-up voltage source to the electrical contact of the second subset of each of the cable plugs of the second plurality.

9. The apparatus of claim 7, wherein the pattern across the first subset of electrical contact of any one of the cable plugs of the first circuit board identifies a specific one of the cable plugs of the second circuit board in response to a multiwire cable connecting the any one of the cable plugs of the first circuit board to the specific one of the cable plugs of the second circuit board.

10. The apparatus of claim 7, wherein the second circuit board includes a second detection circuit configured to obtain other information indicative of whether at least a particular one of the cable plugs of the second circuit board is connected by a multiwire cable to a matched one of the cable plugs of the first circuit board, the second detection circuit being configured to obtain the other information by sensing a pattern of direct current signals across the second subset of the electrical contact of the particular one of the cable plugs of the second circuit board.

* * * * *